United States Patent [19]

Maeda et al.

[11] 4,101,819
[45] Jul. 18, 1978

[54] THREE PHASE CONTROLLING SYSTEM

[75] Inventors: Yasuyuki Maeda; Nobuo Mitsui, both of Katsuta; Tadao Kameyama, Ibaraki; Akinori Watanabe, Katsuta; Katsu Komuro, Katsuta; Sadao Hokari, Katsuta, all of Japan

[73] Assignee: Hitachi, Ltd., Tokyo, Japan

[21] Appl. No.: 645,344

[22] Filed: Dec. 30, 1975

[30] Foreign Application Priority Data

Jan. 6, 1975 [JP] Japan ........................................ 50-65

[51] Int. Cl.² .............................................. G05F 3/04
[52] U.S. Cl. ...................... 323/24; 318/227; 323/25; 323/34
[58] Field of Search ........... 307/252 B, 252 N, 252 T, 307/296, 297; 318/227; 323/4, 16, 19, 22 SC, 24, 25, 34, 35, 36

[56] References Cited

U.S. PATENT DOCUMENTS

| 2,666,888 | 1/1954 | Riley et al. ........................... 323/4 X |
| 3,497,796 | 2/1970 | Konrad ................................. 323/24 |
| 3,876,918 | 4/1975 | Komuro et al. .................. 318/227 X |

FOREIGN PATENT DOCUMENTS 2,401,774  7/1975  Fed. Rep. of Germany ......... 323/25

*Primary Examiner*—A. D. Pellinen
*Attorney, Agent, or Firm*—Craig and Antonelli

[57] ABSTRACT

In a three phase load controlling system two bilateral switching circuits control the current in the first and the third phases; the first phase is later than the third. The second phase is uncontrolled. The gating signals applied to the bilateral switching arrangement connected in the first phase are advanced by a constant degree with respect to the voltage of the first phase. The gating signals applied to the bilateral switching arrangement connected in the third phase are synchronized with the voltage of the third phase.

5 Claims, 7 Drawing Figures

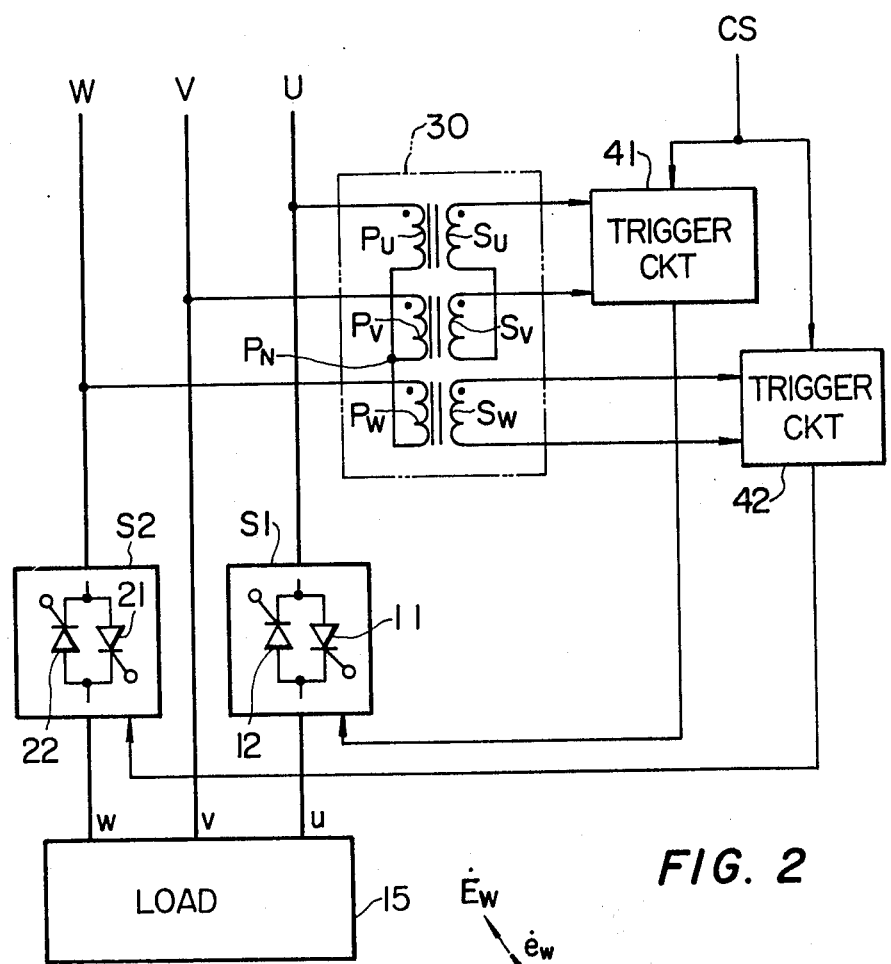
FIG. 1
FIG. 2
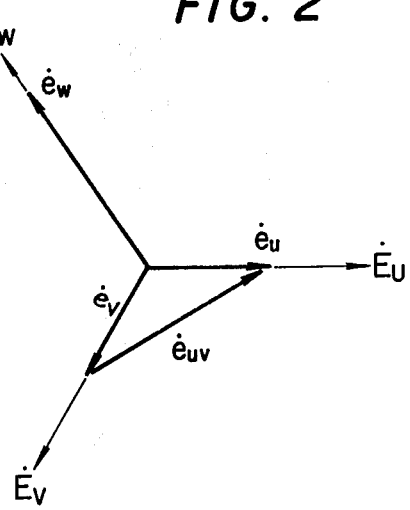

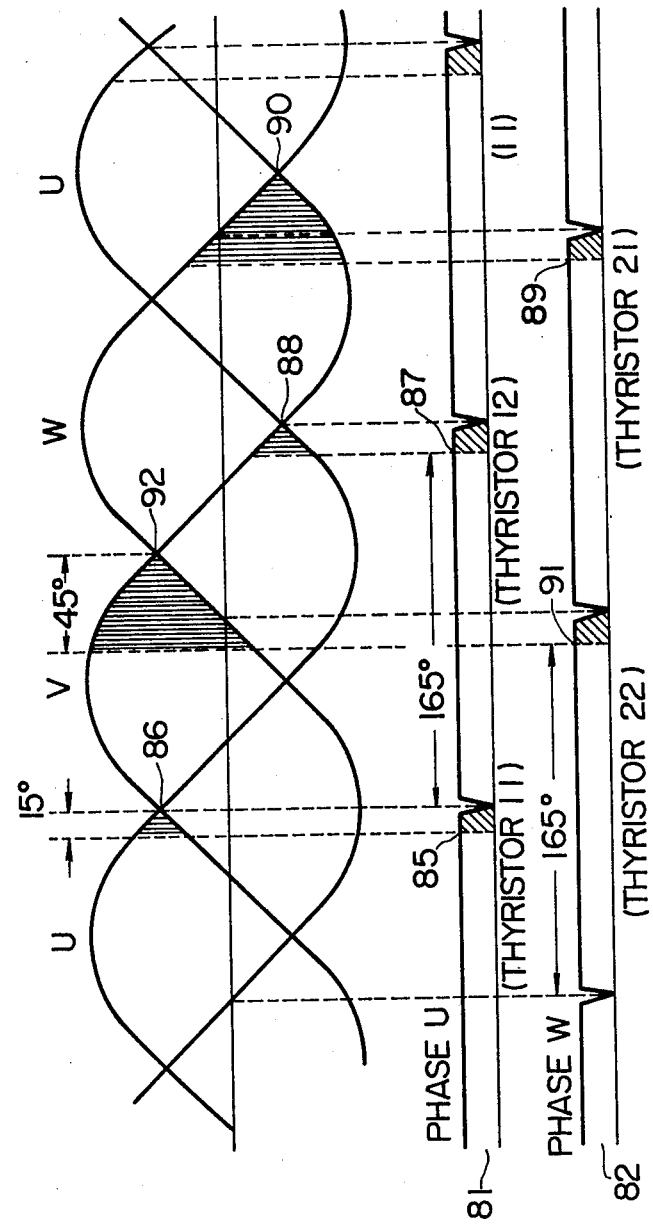

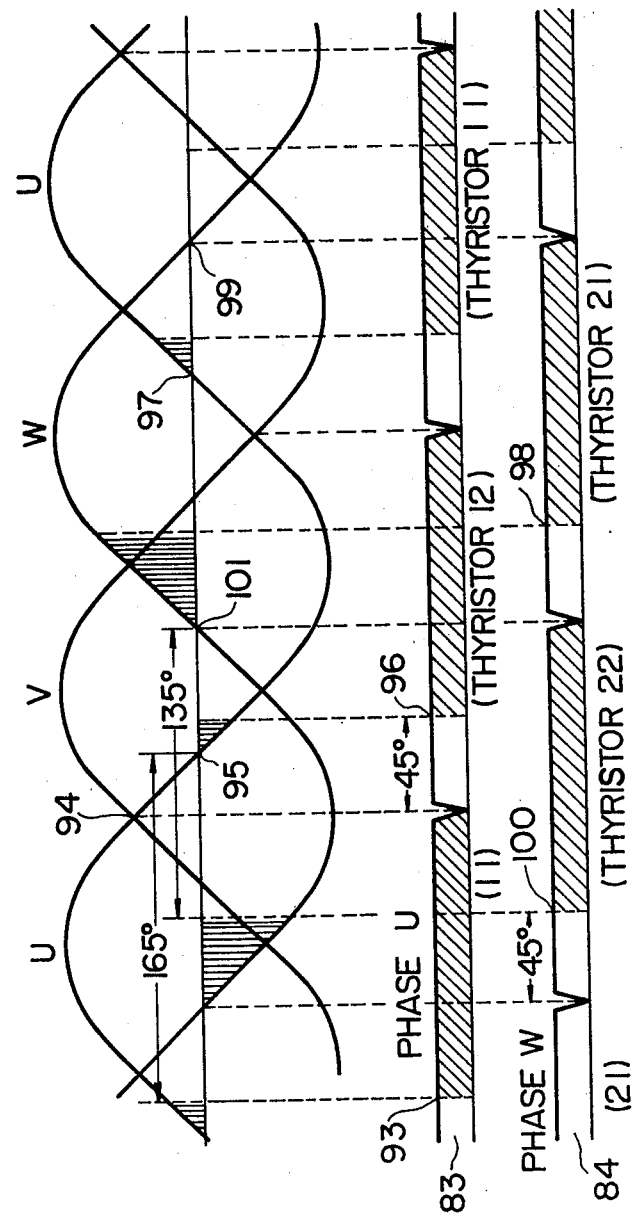

THREE PHASE CONTROLLING SYSTEM

BACKGROUND OF THE INVENTION

The present invention relates to a three phase control system, in detail, to a three phase load controlling system having two bilateral switching elements connected in an arbitrary two of three phases between the load and the power supply, a trigger circuit for applying gating signals to the two bilateral switching elements and a synchronizing circuit for providing electrical signals in synchronism with the frequency of the power supply, for the trigger circuit to provide a predetermined time base from which the retard angles of the trigger circuits can be referenced, whereby the current from the power supply to the load is controlled in only two phases.

Conventionally the trigger signals of switching elements must be synchronized to the line-to-neutral voltages in order to achieve 180° control with a resistive load. However, for short conduction angles a large single phase current can circulate through the load.

To prevent this disadvantage, a gating system as is disclosed in U.S. Pat. No. 3,497,796 has been developed. According to this system, the first switching element is gated on by a trigger circuit which is synchronized by a synchronizing signal which leads the line-to-neutral voltage of the first phase by an angle of 30° and the second switching element is gated on by a trigger circuit which is synchronized by a synchronizing signal which lags the line-to-neutral voltage of the third phase by an angle of 30°.

As will be understood from the description in column 3, lines 19 to 26 of the specification of this patent, however, this gating system results in an inability to achieve 180° control of the current in the third phase. With a minimum retard angle, the line-to-neutral voltage of the third phase is 30° past the zero crossover and this portion of the supply voltage cannot be gated on.

In case the load is an induction motor which drives an elevator cage, the above mentioned inability becomes a limitation in the range of speed control. If the induction motor rotates at constant speed for the entire duration of its operation, the load power factor may remain at a constant degree, e.g. 30°, lagging. However, the induction motor which drives the elevator cage must be controlled over a wide range of changes in speed and load. The load power factor cannot be constant, for example at 30° lagging.

SUMMARY OF THE INVENTION

An object of the present invention is to provide a three phase load controlling system in which a 180° control of the current can be accomplished.

According to a feature of the invention, the gating signals to one of the two bilateral switching circuit which is connected in a later one of the two phases, are advanced by a constant degree with respect to the later phase and the gating signals to the other bilateral switching circuit are synchronized with the phase in which the other bilateral switching means is connected.

BRIEF DESCRIPTION OF THE DRAWINGS

FIG. 1 shows a circuit of an embodiment according to the present invention,

FIG. 2 is a vector diagram showing the phase relationships of three phase voltages, FIGS. 3a and 3b show the waveforms and gating timing charts for a system shown in FIG. 1, wherein FIG. 3a shows the waveform and the timing chart in the case of the large retard angle and FIG. 3b shows those in the case of the small retard angle.

DETAILED DESCRIPTION

Figure 4:
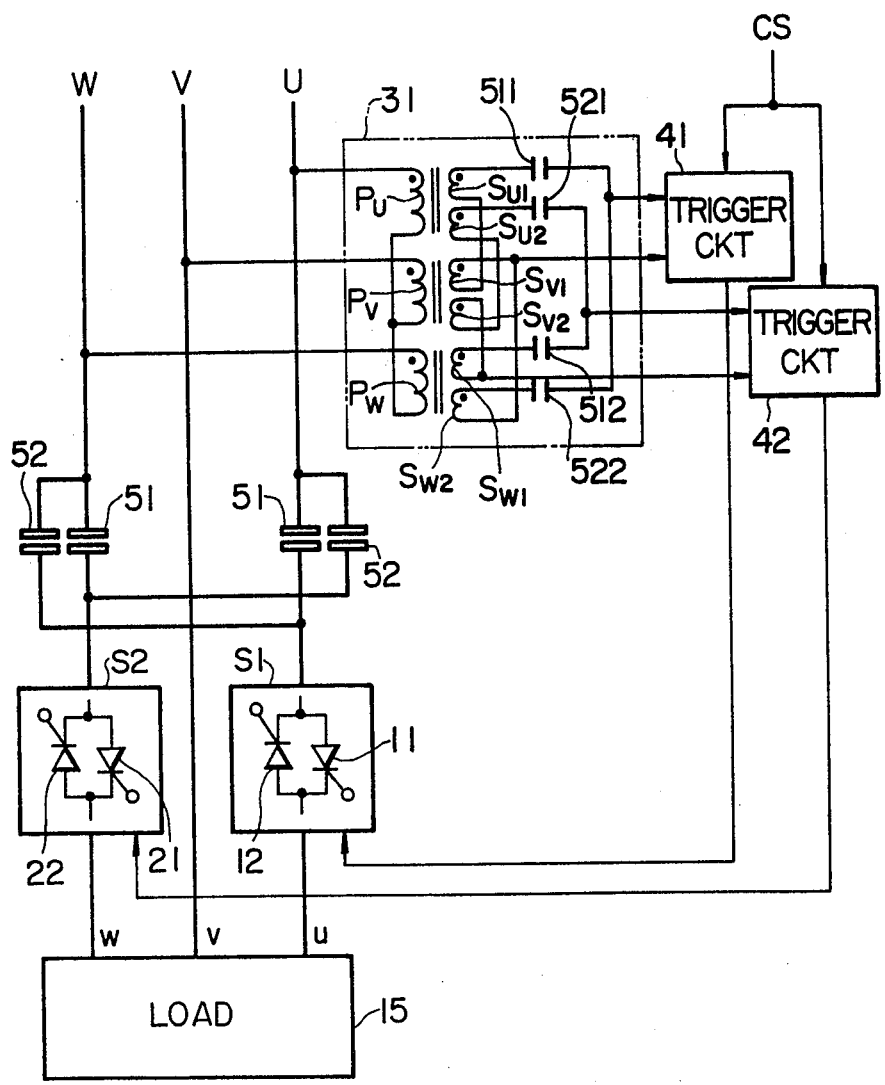
FIG. 4 shows a circuit according to a further embodiment of the invention.

Referring to FIG. 1, reference characters U, V and W indicate respective phase lines of a three phase power source and reference characters $u$, $v$ and $w$ indicate respective terminals of the phases of a three phase load 15. In the phase U line, a bilateral switching circuit S1 is connected, which includes reversely parallel connected thyristors 11 and 12. Similarly to the phase U line, another bilateral switching circuit S2 which includes thyristors 21 and 22 is connected in the phase W line. In the phase V line, a terminal of the power source is connected directly to the terminal $v$ of the load 15. In this case it is assumed that the order of phase rotation is U, V and W. It can, therefore, be seen that phase V is later than phase U, phase W is later than phase V and phase U is later than phase W. The current applied to the load 15 is controlled by changing the firing angle of the thyristors 11 and 12 in the phase U line and 21 and 22 in the phase W line.

A three phase transformer 30 supplies synchronizing signals to trigger circuits 41 and 42. Primary windings $P_U$, $P_V$ and $P_W$ of the three phase transformer 30 are connected in a wye configuration with its input terminals connected to the respective phase lines U, V and W of the power source. One end of a secondary winding $S_U$ associated with the primary winding $P_U$ is connected to one end of a secondary winding $S_V$ associated with the primary winding $P_V$. The other ends of the secondary windings $S_U$ and $S_V$ are connected to the trigger circuit 41. A secondary winding $S_W$ associated with the primary winding $P_W$ is connected directly to the trigger circuit 42.

The phase relationship of the synchronizing signals supplied to the trigger circuits 41 and 42 is shown in FIG. 2. In the figure, reference characters $E_U$, $E_V$ and $E_W$ show the primary voltages in the phases U, V and W of the transformer 30, respectively and, therefore, voltages as shown by reference characters $e_u$, $e_v$ and $e_w$ are induced in the secondary windings $S_U$, $S_V$ and $S_W$. As will be understood from a connection of the secondary windings as shown in FIG. 1, the synchronizing signal applied to the trigger circuit 41 is equal to the vector sum of the voltages $e_u$ and $e_v$ and in phase with the line-to-line voltage $e_{uv}$, namely it has a leading angle 30° with respect to the line-to-neutral voltage of the phase U. While the synchronizing signal to the trigger circuit 42 is synchronized with the voltage of the phase W. If the number of turns of the winding $S_W$ is $\sqrt{3}$ times as many as those of the windings $S_U$ and $S_V$, the value of the voltage $e_w$ is equal to that of the voltage $e_{uv}$. The trigger circuit 41 and 42 which receive these synchronizing signals and a control signal CS apply firing signals to the switching circuits S1 and S2, respectively.

Referring now to FIGS. 3a and 3b the waveforms of a loaded three phase system are represented by curves U, V and W. FIG. 3a shows a case of the large retard angle and FIG. 3b shows a case of the small retard angle. The timing of the gate voltages of the thyristor 11 and 12 is shown in timing charts 81 and 83. The gate signals are advanced by 30° with respect to the line-to-neutral voltage in the phase U. The timing of the thyristors 21 and 22 is shown in timing charts 82 and 84 which show that the gate signals applied to those thyristors are synchronized with the line-to-neutral voltage in the phase W.

Referring to the curve U and the associated timing chart 81 in FIG. 3a using a 165° retard angle, then it can be seen that, at the point 85 where the thyristor 11 is gated on, the voltage of phase U is more positive than the voltage of phase V, so that the thyristor 11 will fire and conduct for a period of 15°, until the voltage of phase V becomes more positive than the voltage of phase U (point 86), causing the thyristor 11 to be reverse biased, thereby turning it off. The firing of the thyristor 12 is similarly advanced, so that when the gate signal is applied to the gate thereof (point 87), the voltage of phase U is more negative than the voltage of phase V and the thyristor 12 will fire and conduct for the remaining 15° before it is turned off (point 88) by being reverse biased through a voltage in phase V which is less negative than the voltage of phase U.

For phase W, the gate signals are synchronized with the line-to-neutral voltage thereof, and when the gate voltage is applied to the thyristor 21 (point 89 of the timing chart 82), with a retard angle of 165°, the voltage of phase W is more positive than the voltage of phase V, causing the thyristor 21 to fire and conduct for 45°, after which time the voltage of phase V reverse biases the thyristor 21 at point 90 and turns it off. Similarly, the thyristor 2 receives its gate signal at a 165° retard angle and fires, because phase W is more negative than phase V (point 91). The thyristor 22 conducts for a period of 45° at the end of which phase V becomes less positive than phase W (point 92), thus causing the thyristor 22 to turn off.

In the manner described by advancing the gate signals to the thyristors 11 and 12 for phase U and synchronizing the gate signals to the thyristors 21 and 22 with the line-to-neutral voltage for phase W, a difference of a conducting period exists between phases U and W; in FIG. 3a, the conducting period is 15° for phase U and is 45° for phase W. At a maximum retard angle of 180°, the single phase current of phase W is circulated through the load 15 for a period of 15°. However, the current during this period is considerably small and the duration of operation with the 180° retard angle is very short; namely there is only a short duration for the starting of a load such as an induction motor. Therefore, the single phase current in this case provides no problem.

The following explanation will be made of the operation with a small retard angle, referring to FIG. 3b; the retard angle is 45° in this case. It will be apparent from the figure that, at the point 93 of the timing chart 83 where the thyristor 11 is gated on, the voltage of phase U is more positive than the voltage of phase V. The voltage of phase W is more positive than the voltage of phase U. Nevertheless, the thyristor 11 is formed biased by the line-to-line voltage of phases U and V because the thyristor 21 is already conductive. At this point, therefore, the thyristor 11 is turned on. The voltage of phase U and V become equal at the point 94 and, thereafter, the voltage of phase V becomes more positive than the voltage of phase U. However, since the voltage of phase W is more negative than that of phase U and the thyristor 22 is already conductive, the current of phase U continues to flow from the power source (phase U) through the thyristor 11, the load (phases U, W), and the thyristor 22 back to the power source (phase W). At the point 95 where the voltage of phase U is zero the line-to-line voltage of phases U and V becomes equal to that between phases W and U and thereafter the former voltage becomes larger than the latter so that the thyristor 11 is reverse biased and turned off. Namely, the thyristor 11 conducts for 165° with respect to the positive half cycle of phase U. The firing of the thyristor 12 is similarly advanced. When the thyristor 12 is gated on (point 96) the voltage of phase V is more positive than the voltage of phase U, so that the thyristor 12 is formed biased and turned on. The current of phase U continues to flow through the thyristor 12, until the voltage of phase U becomes zero (point 97); thus, the thyristor 12 also conducts for 165° with respect to the negative half cycle of phase U.

For phase W, the thyristor 21 is gated on at the point 98 of the timing chart 84, with a 45° retard angle. The voltage of phase W is more positive than that of phase V, causing the thyristor 21 to fire and conduct. At the point 99 where the voltage of phase W is zero, the line-to-line voltage of phases W and V is still positive. However, this voltage is equal to the line-to-line voltage of phases U and W and the thyristor 11 is already turned on. The voltage which is forward applied on the thyristor 21 becomes zero at this point. The thyristor 21 is turned off. Similarly, the thyristor 22 is gated on at the point 100, with a 45° retard angle, and turned off at the point 101 where the voltage of phase W is zero. In this manner, the thyristors 21 and 22 of phase W conduct for 135° in respect of each half cycle of phase W.

It will be noted that, when the retard angle is equal to 30°, the thyristors 11 and 12 conduct for 180° with respect to phase U, while the conducting period of the thyristors 21 and 22 of phase W still remains 150° for phase W. Accordingly, the load current can be further controlled by increasing the conducting period of phase W, until the retard angle of the thyristors 21 and 22 reaches zero.

As described above, according to the embodiment shown in FIG. 1, the load current is controllable for the entire period of the retard angle. There is always a difference of 30° in the conducting period between phases U and W. However, at a zero retard angle in which the load current is maximum, there is no difference in the conducting period; both pairs of thyristors 11, 12, and 21, 22 conduct for the entire period of 180° in respective phases.

FIG. 4 shows a further embodiment, in which an induction motor used as the load can rotate reversely. For this purpose, contactors 51 and 52 are further provided. By operating these contactors 51 and 52, the phase rotation of the three phase voltage to the motor 15 from the power source can be reversed. It is assumed here that the motor rotates clockwise by closing the contactor 51 and counterclockwise by closure of the contactor 52. Both the contactors 51 and 52 have auxiliary contacts 511, 512, and 521, 522, respectively. A three phase transformer 31 which supplies the synchronizing signals to the trigger circuits 41 and 42 is connected to the three phase power source U, V and W in the primary side, in the same way as shown in FIG. 1. Primary windings $P_U$, $P_V$ and $P_W$ are associated with two secondary windings $S_{U1}$, $S_{U2}$, $S_{V1}$, $S_{V2}$ and $S_{W1}$, $S_{W2}$, respectively. One end of the winding $S_{U1}$ is connected to one terminal of the trigger circuit 41 through the auxiliary contact 511. The other end of the winding $S_{U1}$ is connected to the other terminal of the trigger circuit 41 through the winding $S_{V1}$. One end of the winding $S_{U2}$ is connected to one terminal of the trigger circuit 42 through the auxiliary contact 521. The other end of the winding $S_{U2}$ is connected to the other terminal of the trigger circuit 42 through the winding $S_{V2}$. One end of the winding $S_{W1}$ is connected to the one end of the trigger circuit 42 through the auxiliary contact 512. The other end of the winding $S_{W1}$ is directly connected to the other terminal of the trigger circuit 42. One end of the winding $S_{W2}$ is connected to the one end of the trigger circuit 41 through the auxiliary contact 522. The other end of the winding $S_{W2}$ is directly connected to the other terminal of the trigger circuit 41.

With such a connection of the secondary windings, when the contactor 51 is closed so that the phase rotation of the voltage to the motor 15 is in order of U→V→W, the synchronizing voltage to the trigger circuit 41 is equal to a vector sum of the voltage of the windings $S_{U1}$ and $S_{V1}$ by closure of the auxiliary contact 511 and the synchronizing voltage to the trigger circuit 41 is synchronized with the winding $S_{W1}$ by closure of the auxiliary contact 512. In this case the relationship of the phase rotation is the same as in FIG. 1.

In case the contactor 52 is closed, the switching circuit S1 is inserted into phase W with respect to the power source phase and the switching circuit S2 into phase U. Accordingly, the phase rotation of the voltage to the motor 15 changes from order U→V→W to order W→V→U. In the transformer 31 the auxiliary contacts 521 and 522 are closed so that the syncrhonizing voltage to the trigger circuit 41 is the voltage of the winding $S_{W2}$ and the synchronizing voltage to the trigger circuit 42 is equal to the vector sum of the voltage of the windings $S_{U2}$ and $S_{V2}$. Consequently, the firing signals from the trigger circuit 41 which are synchronized with phase W are applied to the switching circuit S1, causing the thyristors 11 and 12 to fire and conduct. While the firing signals from the trigger circuit 42 which are advanced by 30° with respect to phase U are supplied to the switching circuit S2 in order to turn on the thyristors 21 and 22.

Figure 5:
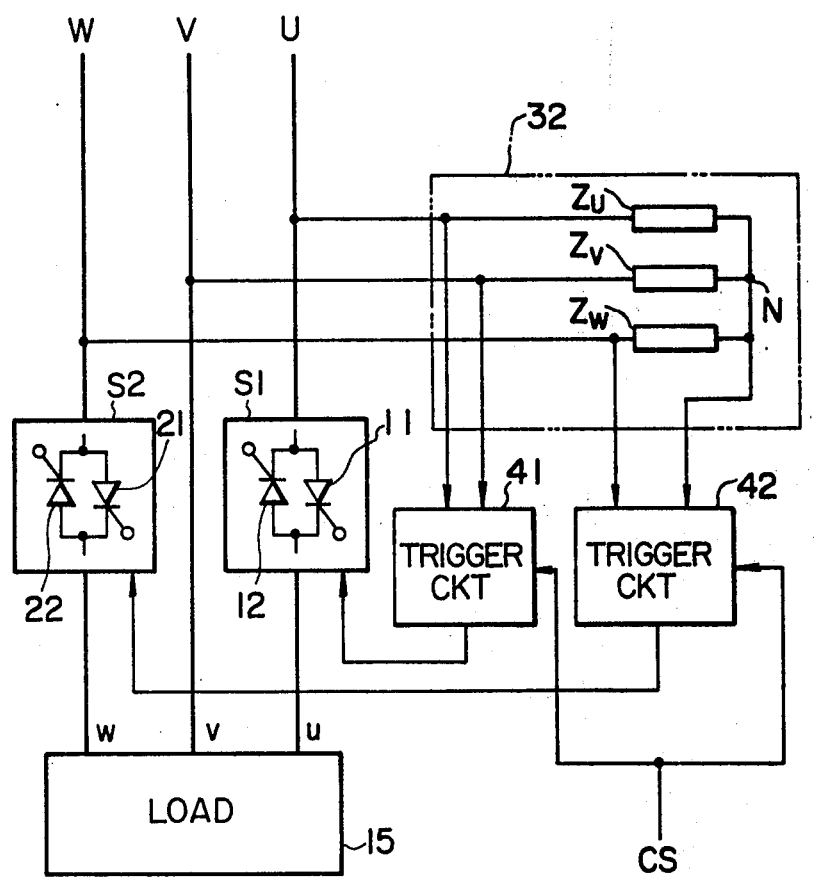
FIG. 5 shows a circuit of another embodiment.

FIG. 5 shows another embodiment, in which a three phase impedance circuit 32 is substituted for the transformer 30 or 31 in FIG. 1 or FIG. 4. The impedance circuit 32 has three impedance elements $Z_U$, $Z_V$ and $Z_W$, one end of each of which is connected to the corresponding phase line of the power source and the other ends of which are connected in common at the point N. The synchronizing voltage to the trigger circuit 41 is obtained from the one end of the element $Z_U$ and that of the element $Z_V$. This voltage, therefore, is in phase of the line-to-line voltage of phases U and V, which advances by 30° in respect to phase U. The synchronizing voltage to the trigger circuit 42 is provided in both ends of the elements $Z_W$ to be synchronized with phase W. It will be apparent from the above description that the object of the present invention can also be accomplished by this arrangement.

Figure 6:
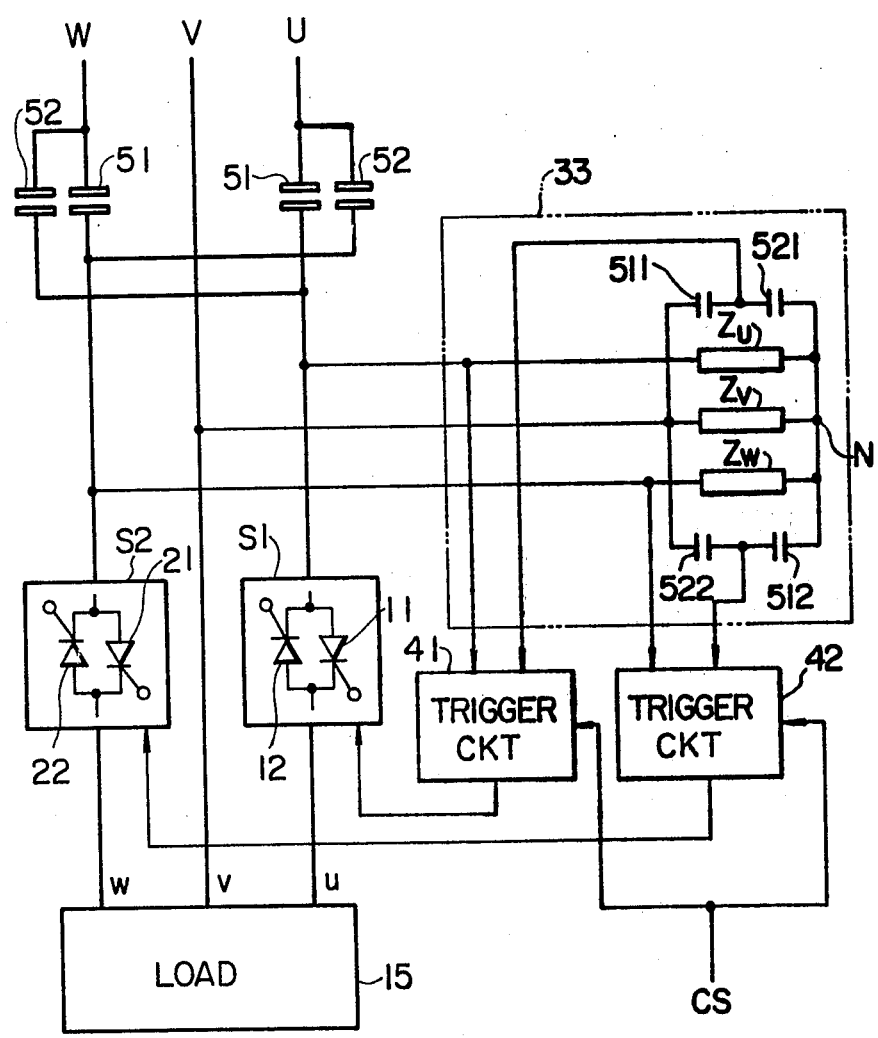
FIG. 6 shows a circuit according to a further embodiment of the invention.

FIG. 6 shows a further embodiment of the arrangement shown in FIG. 5—an application for a control circuit of a reversely rotatable induction motor. The common connection point N is connected to the one end of the element $Z_V$ through two series connections of the auxiliary contacts 511, 512 and 521, 522. The synchronizing voltage to the trigger circuit 41 is derived from one end of the element $Z_U$ and a connecting point of the series connection of the auxiliary contacts 511 and 521. The synchronizing voltage to the trigger circuit 42 is obtained from one end of the element $Z_W$ and a connecting point of the series connection of the auxiliary contacts 512 and 522. In case a circuit for the clockwise rotation of the induction motor 15 is formed by closure of the contactors 51, the auxiliary contacts 511 and 512 are closed in the impedance circuit 33. The synchronizing voltage to the trigger circuit 41 is obtained from the one end of the element $Z_U$ and that of the element $Z_V$ so that the voltage is synchronized with the line-to-line voltage of phases U and V. The synchronizing voltage to the trigger circuit 42 is provided at both ends of the element $Z_W$ to synchronize with phase W. The firing signals from the trigger circuits 41 and 42 are supplied to the switching circuits S1 and S2, respectively.

When the contact 52 is closed, then a circuit for the counter-clockwise rotation of the motor 15 is provided; namely, the switching circuit S1 is inserted into phase W with respect to the power source phase and the switching circuit S2 into phase U. Further, the auxiliary contacts 521 and 522 are closed in the impedance circuit 33. In this case, both terminals of the trigger circuit 41 are connected to both ends of the element $Z_U$. One end of the trigger circuit 42 is connected to the one end of the element $Z_V$ through the closed auxiliary contact 522 and the other end to the one end of the element $Z_W$. Accordingly, a voltage which is synchronized with phase W is supplied to the trigger circuit 41, from which the firing signals are given to the switching circuit S1 in phase W. The synchronizing voltage for the trigger circuit 42 is obtained from the one end of the element $Z_V$ and that of the element $Z_W$, to be synchronized with the line-to-line voltage of phases U and V. The firing signal from the trigger circuit 42 is applied to the switching circuit S2 in phase U to cause the thyristors 21 and 22 to fire synchronously with the line-to-line voltage of phases U and V.

While we have shown and described several embodiments in accordance with the present invention, it is understood that the same is not limited thereto but is susceptible of numerous changes and modifications as known to a person skilled in the art and, We, therefore, do not wish to be limited to the details shown and described herein but intend to cover all such changes and modifications as are obvious to one of ordinary skill in the art.

We claim:
1. In a three phase load control system including:
   first and second bilateral switching circuits respectively connected in two of the three phase lines between a load and a power supply therefor,
   trigger means for applying gating signals to said first and second bilateral switching circuits, and
   a synchronizing circuit for providing electrical signals in synchronism with the frequency of the power supply voltage for said trigger means to provide a prescribed time base from which retard angles for the gating signals from said trigger circuit are referenced,
   the improvement wherein said synchronizing circuit contains means for controlling said trigger means so that the gating signals, which are applied to the one of said bilateral switching circuits which is connected in the one of said two phase lines having the later phase, are advanced by a constant degree with respect to said later phase which constant degree is no greater than 120°, and the gating signals, which are applied to the other of said bilateral switching circuits, are synchronized to be in phase with the phase of the phase line in which said other bilateral switching circuit is connected.

2. In a three phase load control system including:

first and second bilateral switching circuits respectively connected in two of the three phase lines between a load and a power supply therefor, trigger means for applying gating signals to said first and second bilateral switching circuits, and a synchronizing circuit for providing electrical signals in synchronism with the frequency of the power supply voltage for said trigger means to provide a prescribed time base from which retard angles for the gating signals from said trigger circuit are referenced, the improvement wherein said synchronizing circuit contains means for controlling said trigger means so that the gating signals, which are applied to the one of said bilateral switching circuits which is connected in the one of said two phase lines having the later phase, are advanced by a constant degree with respect to said later phase, and the gating signals, which are applied to the other of said bilateral switching circuits, are synchronized with the phase of the phase line in which said other bilateral switching circuit is connected, and wherein said synchronizing circuit comprises a three phase transformer having primary windings connected in a Y-configuration to the three-phase lines of said power supply, a first secondary winding associated with the primary winding of the phase of the phase line in which said other bilateral switching circuit is connected, and providing the time base control of said trigger means for the gating signals for said other bilateral switching circuit, and second and third secondary windings, associated with the other two phases of the remaining two phase lines, connected in series and providing the time base control of said trigger means for the gating signals for said one bilateral switching circuit.

3. The improvement according to claim 2, further comprising phase rotation changing means, coupled in said two of the three phase lines and to secondary windings of said three phase transformer, for changing the phase rotation of the voltage supplied from said power supply to said load, said phase rotation changing means having a plurality of auxiliary contacts connected to the secondary windings of said transformer so that the time base controls of said trigger means are exchanged with each other upon reversing the phase rotation of the voltage to the load.

4. In a three phase load control system including:

first and second bilateral switching circuits respectively connected in two of the three phase lines between a load and a power supply therefor, trigger means for applying gating signals to said first and second bilateral switching circuits, and a synchronizing circuit for providing electrical signals in synchronism with the frequency of the power supply voltage for said trigger means to provide a prescribed time base from which retard angles for the gating signals from said trigger circuit are referenced, the improvement wherein said synchronizing circuit contains means for controlling said trigger means so that the gating signals, which are applied to the one of said bilateral switching circuits which is connected in the one of said two phase lines having the later phase, are advanced by a constant degree with respect to said later phase, and the gating signals, which are applied to the other of said bilateral switching circuits, are synchronized with the phase of the phase line in which said other bilateral switching circuit is connected, and wherein said synchronizing circuit comprises three impedance elements connected in a Y-configuration to the three-phase lines of said power supply, the opposite ends of the impedance element which is connected to the phase line in which said other bilateral switching circuit is connected providing the time base control of said trigger means for the gating signals for said other bilateral switching circuit, and the ends of the remaining two impedance elements which are connected to the remaining two phase lines providing the time base control of said trigger means for the gating signals for said one bilateral switching circuit.

5. The improvement according to claim 4, further comprising phase rotation changing means, coupled in said two of the three phase lines and to said impedance elements, for changing the phase rotation of the voltage supplied from said power supply to said load, said phase rotation changing means having a plurality of auxiliary contacts connected between the ends of said impedance elements and said trigger means so that the time base controls of said trigger means are exchanged with each other upon reversing the phase rotation of the voltage to the load.

* * * * *